US012704187B2

(12) United States Patent
Metker et al.

(10) Patent No.: US 12,704,187 B2
(45) Date of Patent: Aug. 11, 2026

(54) FLOW MODULATOR FOR A FLUID

(71) Applicant: PITTWAY SARL, Rolle (CH)

(72) Inventors: Clemens Metker, Bad Iburg (DE); Martin Petersmann, Osnabrueck (DE); Anton Quatmann, Vechta (DE); Ulrich Oldehus, Lohne (DE); Sven Boller, Bramsche (DE)

(73) Assignee: PITTWAY SARL, Rolle (CH)

( * ) Notice: Subject to any disclaimer, the term of this patent is extended or adjusted under 35 U.S.C. 154(b) by 8 days.

(21) Appl. No.: 18/560,345

(22) PCT Filed: May 23, 2022

(86) PCT No.: PCT/EP2022/063911
§ 371 (c)(1),
(2) Date: Nov. 10, 2023

(87) PCT Pub. No.: WO2022/248408
PCT Pub. Date: Dec. 1, 2022

(65) Prior Publication Data

US 2024/0247725 A1 Jul. 25, 2024

(30) Foreign Application Priority Data

May 28, 2021 (EP) .................................... 21176651

(51) Int. Cl.
*F16K 3/08* (2006.01)
*F16K 31/53* (2006.01)
(Continued)

(52) U.S. Cl.
CPC .............. *F16K 3/08* (2013.01); *F16K 31/535* (2013.01); *F16K 31/043* (2013.01); *F23D 14/46* (2013.01)

(58) Field of Classification Search
CPC ........ F16K 3/08; F16K 31/535; F16K 31/043; F16K 31/5282
See application file for complete search history.

(56) References Cited

U.S. PATENT DOCUMENTS

2011/0180737 A1 7/2011 Moench et al.
2020/0290424 A1* 9/2020 Zhan ...................... B60G 17/08

FOREIGN PATENT DOCUMENTS

EP 3792531 A1 3/2021
GB 2200715 A 8/1988

OTHER PUBLICATIONS

International Search Report and Written Opinion in PCT International Application No. PCT/EP2022/063911 mailed Sep. 14, 2022. (8 pages).

* cited by examiner

*Primary Examiner* — Reinaldo Sanchez-Medina
*Assistant Examiner* — Nicole Gardner
(74) *Attorney, Agent, or Firm* — Greenberg Traurig LLP; Ryan D. Sharp; David J. Dykeman

(57) ABSTRACT

Flow modulator (10) for a fluid like combustion gas, comprising: a modulator body (11) having a channel (14) providing a flow passage (20) for the fluid: a valve body (17) having an opening (18) providing another flow passage (19) for the fluid: an actuator (21) by which the valve body (17) is rotatably displaceable relative to the modulator body (11) to modulate the fluid flow by changing the overlap between the opening (18) or flow channel (19) of the valve body (17) and the channel (14) or flow passage (20) of the modulator body (11); a gear transmission (22), wherein an input side of the gear transmission (22) is in operative connection with the actuator (21) having a fixed axis of rotation (23), and wherein an output side of the gear transmission (22) is in (Continued)

Figure 1A:
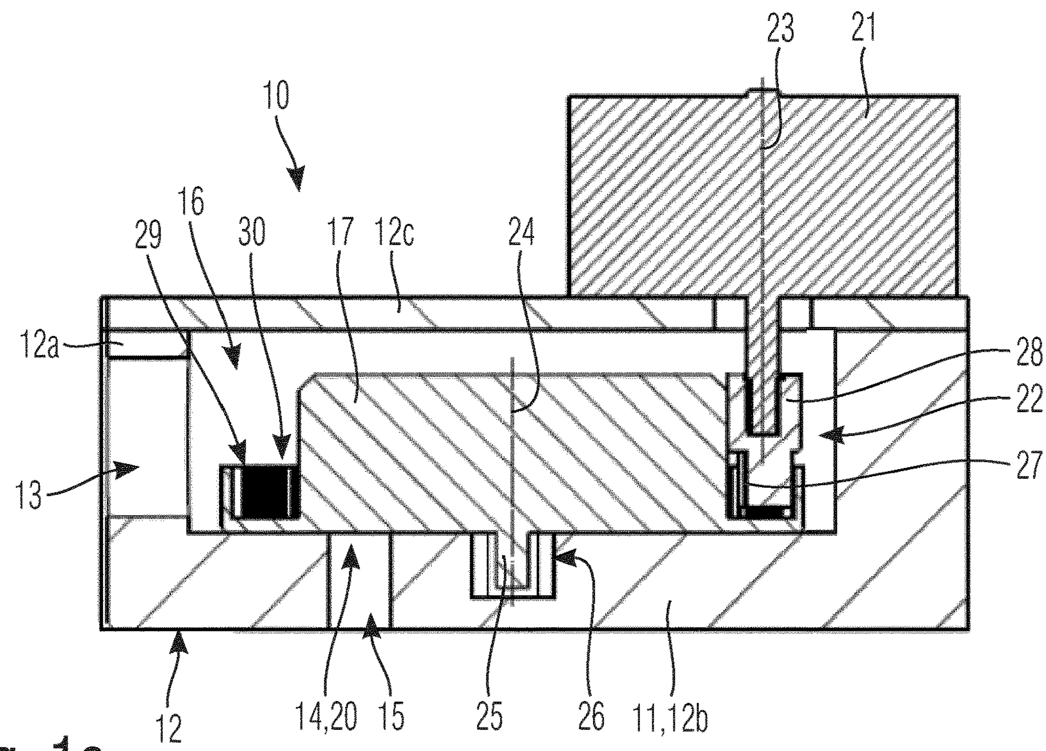

operative connection with the valve body (17) having a translationally displaceable axis of rotation (24).

11 Claims, 5 Drawing Sheets

(51) Int. Cl.
*F16K 31/04* (2006.01)
*F23D 14/46* (2006.01)

FLOW MODULATOR FOR A FLUID

CROSS-REFERENCE TO RELATED APPLICATIONS

This application is a U.S. National Phase patent application under 35 U.S.C. 371 of International Application No. PCT/EP2022/063911, filed May 23, 2022, which claims priority to and the benefit of EP Application Serial No. 21176651.4, filed May 28, 2021, each of which are incorporated herein by reference in their entireties.

The invention relates to a flow modulator for a fluid like combustion gas.

DE 40 30 717 A1 discloses a flow modulator for a fluid having a housing and a valve body. The valve body is provided by a foil element. The foil element has an opening for the fluid. The foil element is carried by a driver. The driver and the foil element are both positioned within a chamber of the housing. The driver and the foil element are both linear displaceable within the chamber of the housing thereby changing an overlap between an opening of the housing and the opening of the foil element.

EP 3 792 531 A1 discloses another flow modulator for a fluid comprising a housing, a modulator body, and a valve body. The modulator body has a flow channel and an opening providing together a flow passage for the fluid. The valve body is provided by a foil element. The foil element has an opening for the fluid. The foil element is rotatable relative to the modulator body to modulate the flow of the fluid by adjusting an overlap between the opening of the valve body and the flow passage of the modulator body.

Against this background, a novel flow modulator for a fluid like combustion gas is provided.

The novel flow modulator for a fluid like combustion gas according to the present disclosure comprises a modulator body having a channel providing a flow passage for the fluid.

The novel flow modulator further comprises a valve body having an opening providing another flow passage for the fluid.

The novel flow modulator further comprises an actuator by which the valve body is rotatably displaceable relative to the modulator body to modulate the fluid flow by changing the overlap between the opening of the valve body and the channel of the modulator body.

The novel flow modulator further comprises a gear transmission, wherein an input side of the gear transmission is in operative connection with the actuator having a fixed axis of rotation, and wherein an output side of the gear transmission is in operative connection with the valve body having a translationally displaceable axis of rotation.

The novel flow modulator provides a reliable flow modulation of the fluid. The gear transmission of the flow modulator allows for a tolerance-compensation within the flow modulator, namely to compensate component tolerance of the flow modulator. Simple and inexpensive assembly of the flow modulator is possible. A large resolution of flow resistance is made possible by a respective transmission ratio of the gear transmission.

Preferably, the valve body has a guide pin being positioned in the axis of rotation of the valve body, and the modulator body has a guide groove for the guide pin of the valve body, wherein the guide groove is configured to allow a rotational displacement of the valve body relative to the modulator body, is further configured to allow a translational displacement of the valve body relative to the modulator body in a distance direction of the axis of rotation of the actuator and the axis of rotation of the valve body, and is further configured to prevent a translational displacement of the valve body relative to the modulator body diagonal and/or orthogonal to said distance direction of the axis of rotation of the actuator and the axis of rotation of the valve body. The allows for a very favorable tolerance-compensation within the flow modulator.

Preferably, the gear transmission comprises a first toothing provided by a drive wheel, the gear transmission comprises a second toothing provided by the valve body, wherein the first toothing is in operative connection with the second toothing. Preferably, the valve body has a circumferential groove, wherein the drive wheel is at least partially positioned within said circumferential groove, and wherein the circumferential groove has radial width being configured to allow rotation of the valve body relative to the modulator body around the axis of rotation of the valve body while keeping the first toothing of the drive wheel always in operative connection with the second toothing of the valve body. This allows a favorable tolerance-compensation within the flow modulator while providing a simple and inexpensive assembly of the flow modulator.

The first toothing may be provided by a section of the drive wheel that is at least partially positioned within said circumferential groove, while the second toothing is provided by a wall of the circumferential groove. Alternatively, the first toothing is provided by a section of the drive wheel that is positioned outside of said circumferential groove, while the second toothing is provided by a wall of the valve body.

Figure 1B:
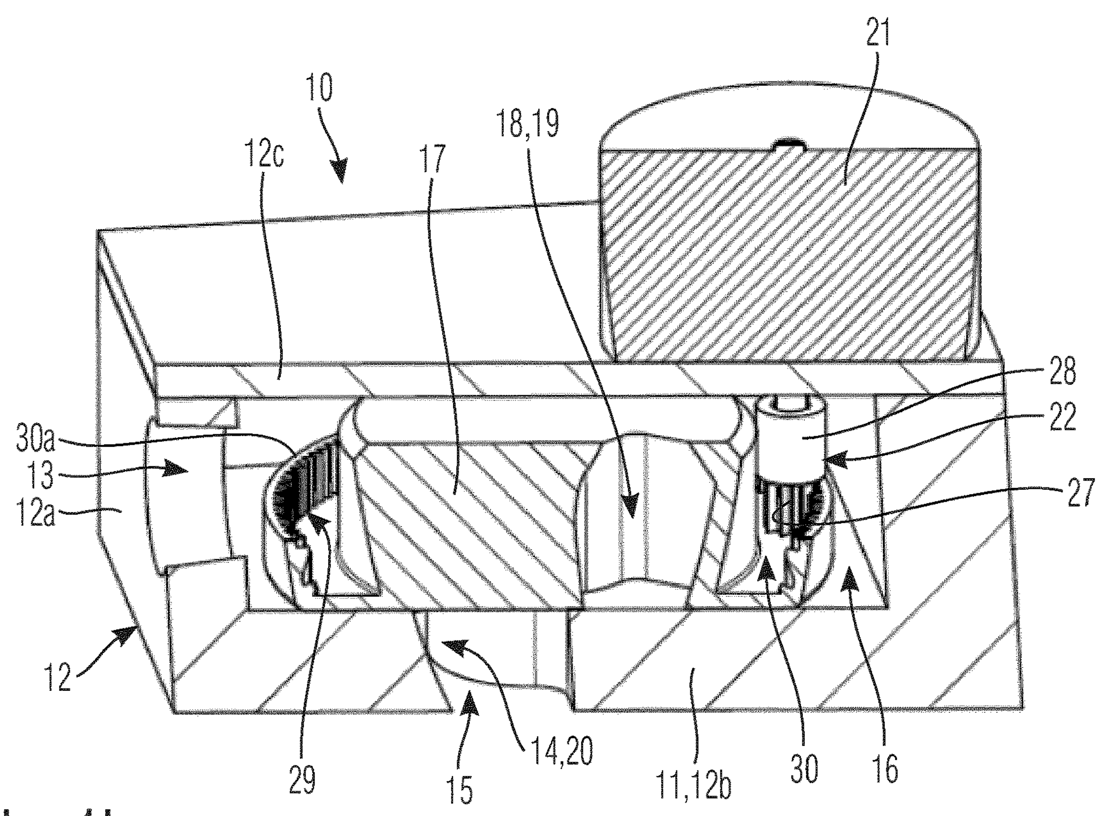
Figure 1C:
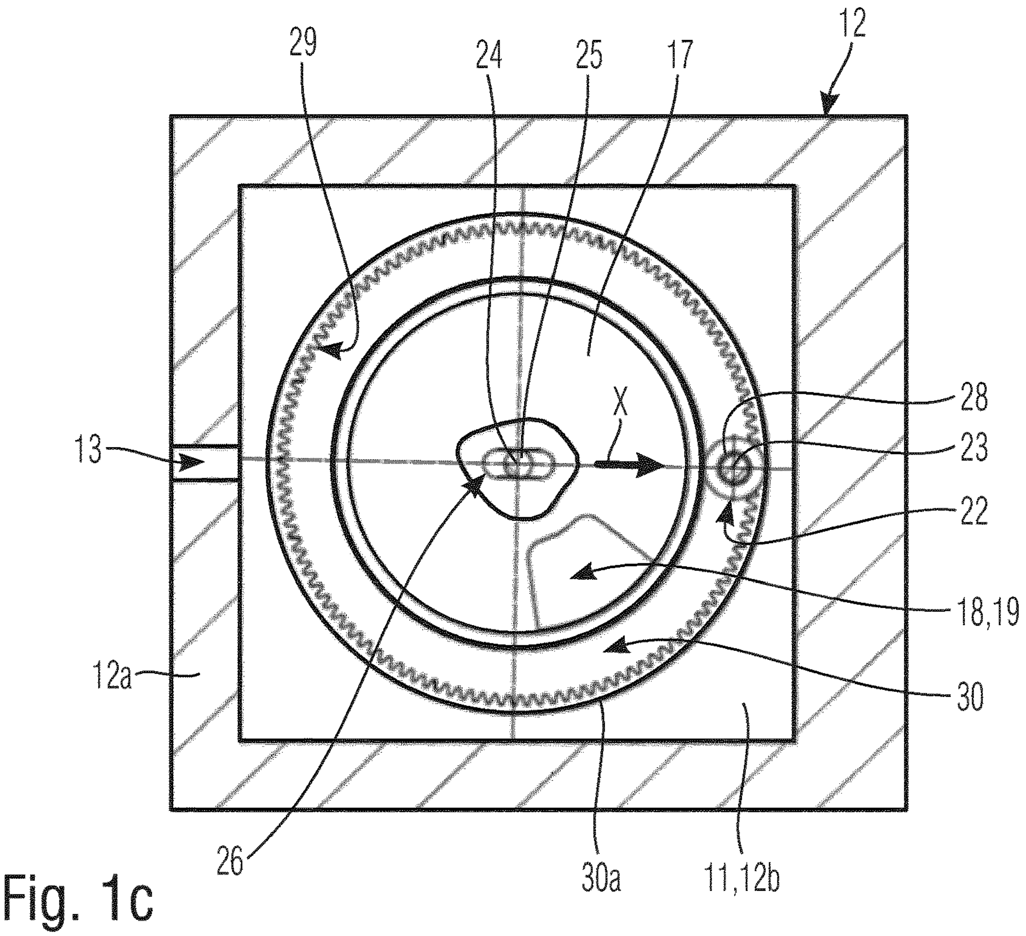
Figure 1D:
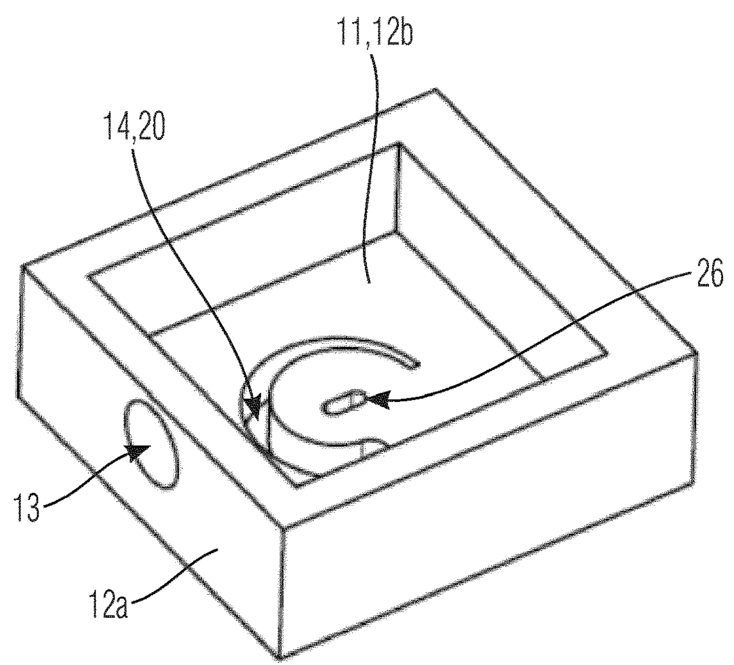

Preferred developments of the invention are provided by the dependent claims and the description of the drawings. Exemplary embodiments are explained in more detail on the basis of the drawing, in which:

FIG. 1*a* shows a cross section of a flow modulator according to a first embodiment of the invention;

FIG. 1*b* shows another cross section of a flow modulator according to the first embodiment of the invention;

FIG. 1*c* shows another cross section of a flow modulator according to the first embodiment of the invention;

FIG. 1*d* shows a perspective view of a detail of the flow modulator of FIGS. 1*a* to 1*c;*

Figure 2A:
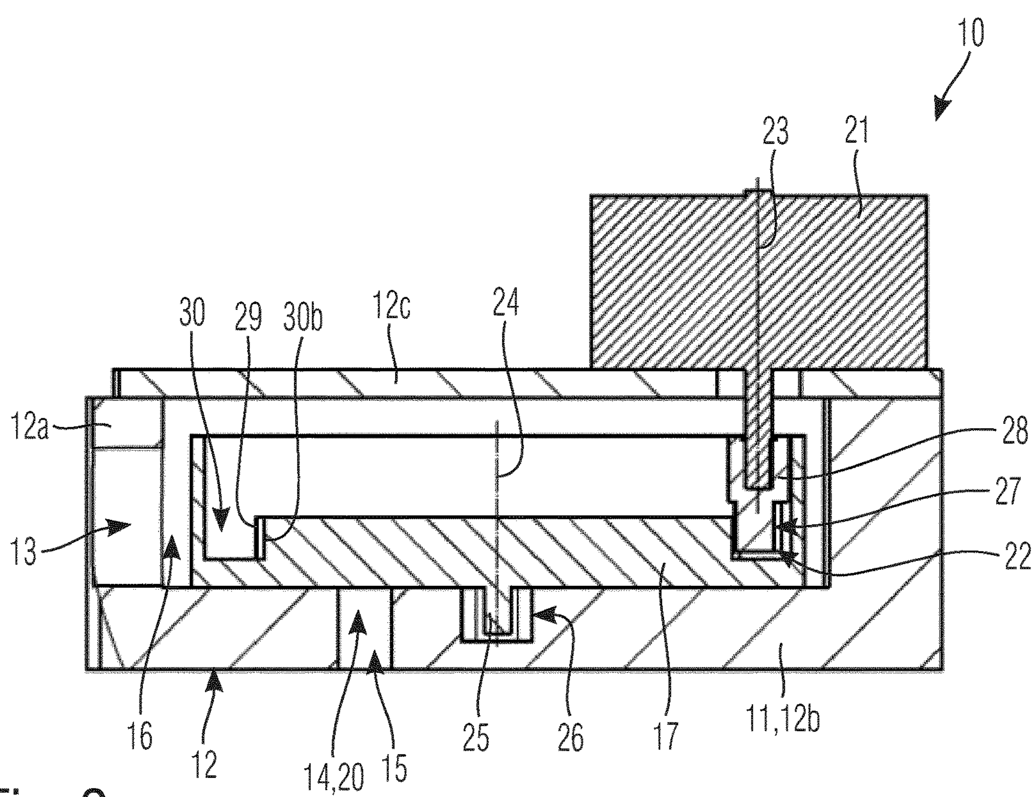
Figure 2B:
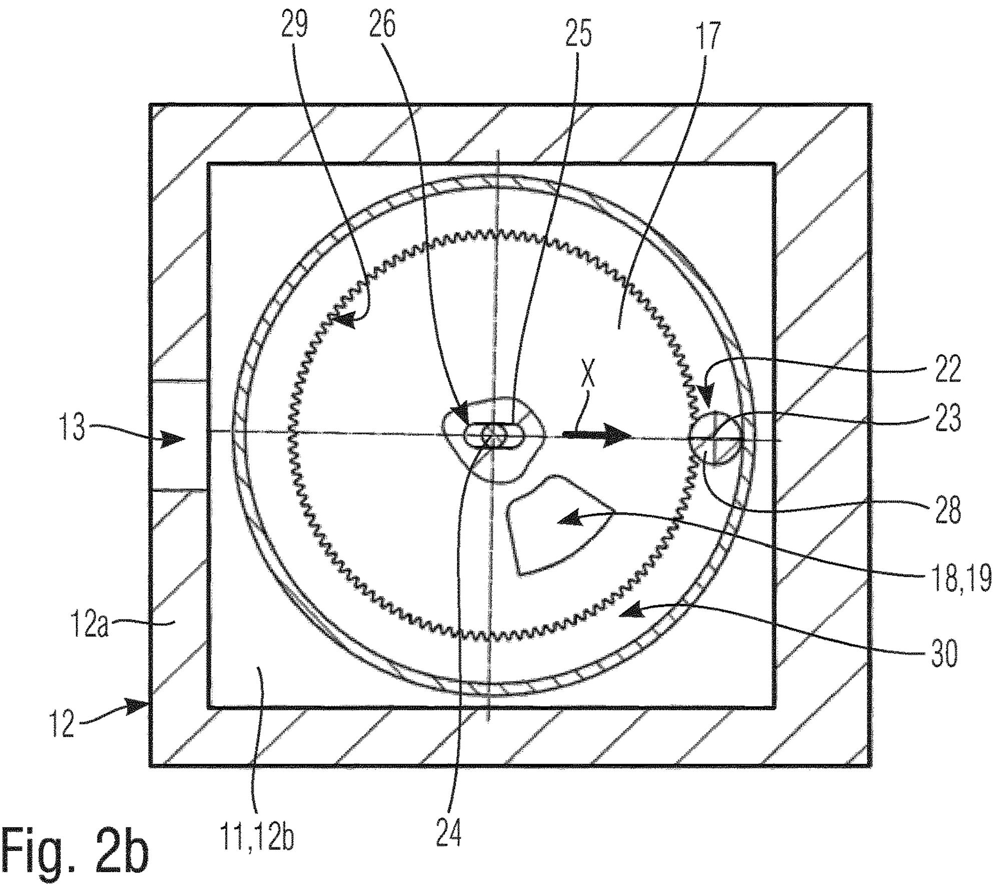
Figure 3A:
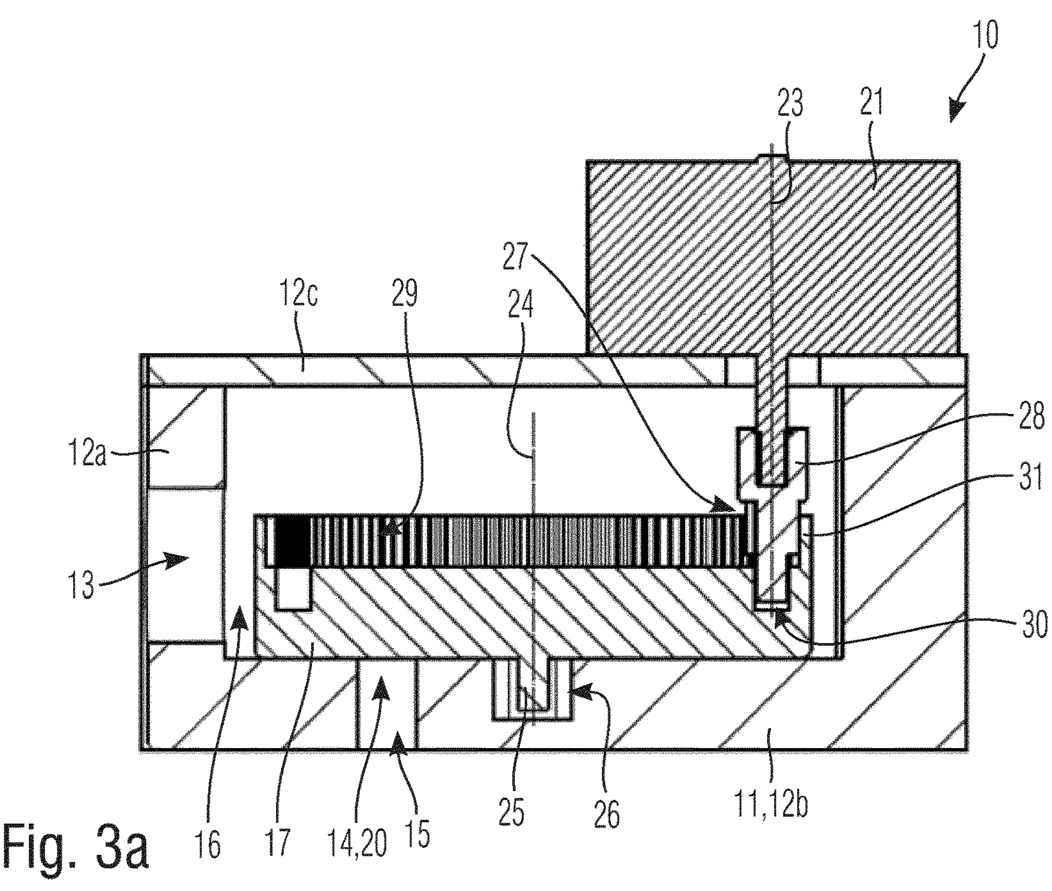
Figure 3B:
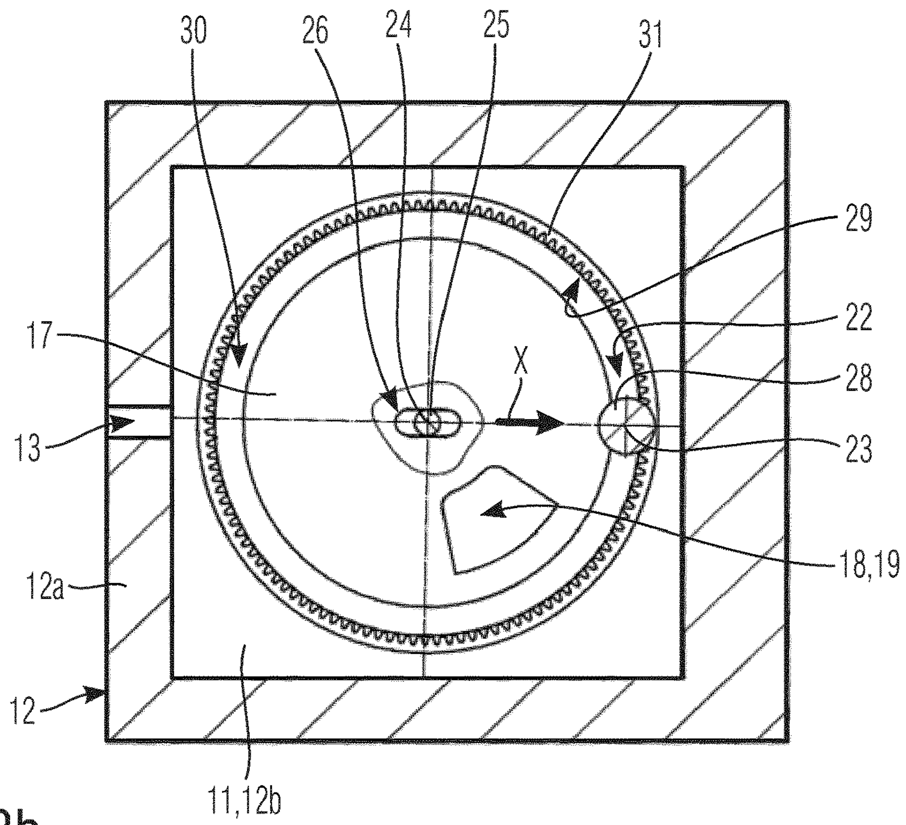
Figure 4A:
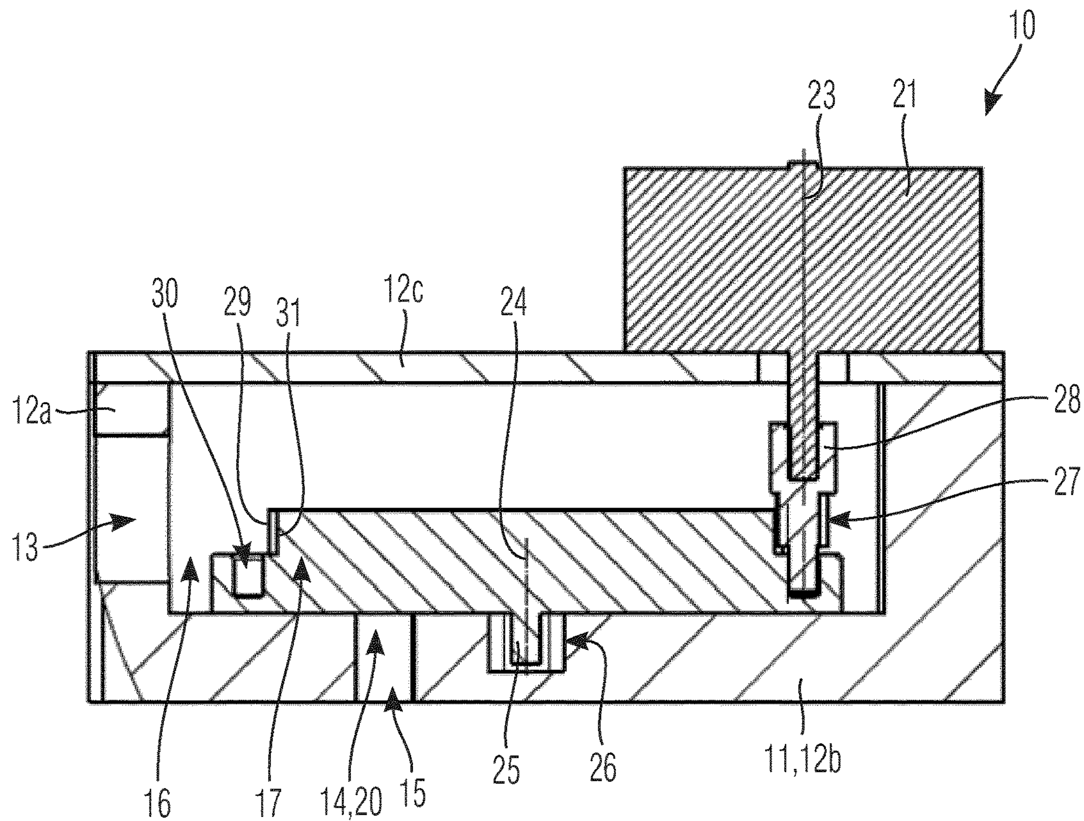
Figure 4B:
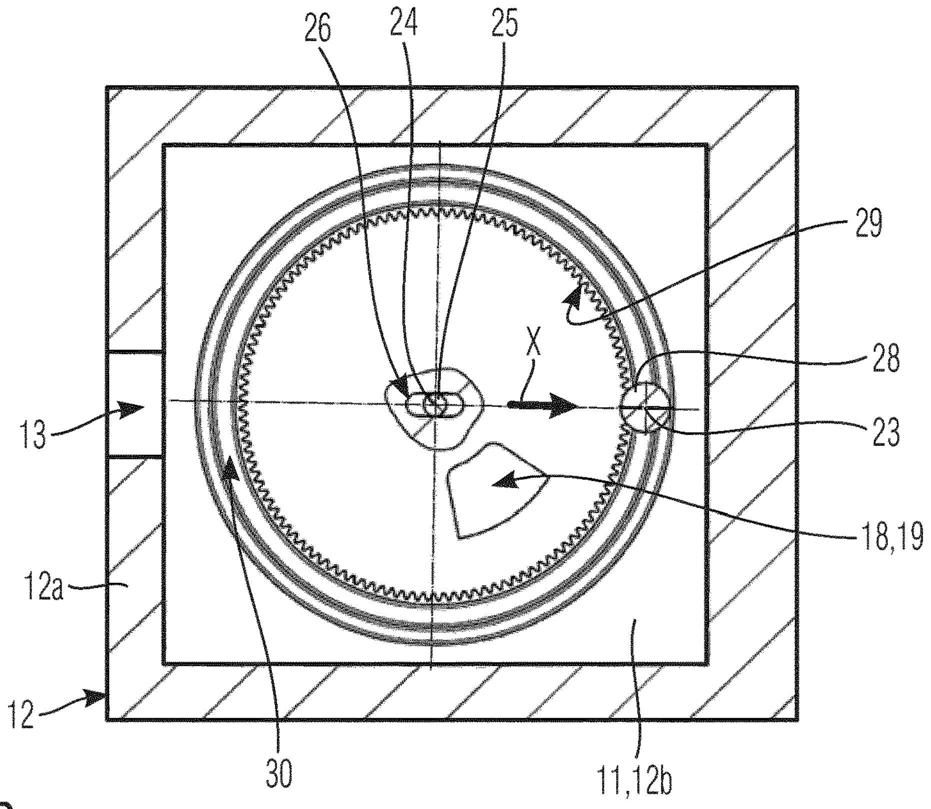

FIG. 2*a* shows a cross section of a flow modulator according to a second embodiment of the invention;

FIG. 2*b* shows another cross section of a flow modulator according to the second embodiment of the invention;

FIG. 3*a* shows a cross section of a flow modulator according to a third embodiment of the invention;

FIG. 3*b* shows another cross section of a flow modulator according to the third embodiment of the invention;

FIG. 4*a* shows a cross section of a flow modulator according to a fourth embodiment of the invention;

FIG. 4*b* shows another cross section of a flow modulator according to the fourth embodiment of the invention.

The present invention relates to a flow modulator 10 for a fluid, preferably for a gaseous fluid like combustion gas. The flow modulator 10 is preferably part of a gas burner appliance of a heating system. A flow modulator for a gaseous fluid can also be called gas flow modulator.

FIGS. 1*a* to 4*b* show different views of flow modulators 10 according to the invention. Identical reference signs are used for identical or similar parts.

The flow modulator 10 comprises a modulator body 11.

The modulator body 11 may be part of a housing 12. The housing 12, namely a side wall 12*a* of the housing 12, provides an opening 13 acting as inlet port for the fluid. The modulator body 11 may provide a bottom wall 12*b* of the housing 12.

The modulator body 11 has a channel 14 providing a flow passage 20 for the fluid. Said channel 14 or flow passage 20 is in communication with an opening acting as outlet port for the fluid.

A top wall 12*c* of the housing 12 delimits together with the bottom wall 12*b* and the side walls 12*a* an interior space 16 of the housing 12.

It should be noted that the flow direction of the fluid may also be in the opposite way. In this case the opening 15 acts as inlet port for the fluid and the opening 13 acts as outlet port for the fluid.

The flow modulator 10 further comprises a valve body 17. The valve body 17 is positioned within the interior space 16 of the housing 12. The valve body 17 has an opening 18 providing another flow passage 19 for the fluid.

The flow modulator 10 further comprises an actuator 21. The actuator 21 may be an electrical motor like a stepper motor.

By use of the actuator 21 the valve body 17 is rotatably displaceable relative to the modulator body 11 to modulate the fluid flow. The fluid flow is modulated by changing the overlap between the opening 18 or flow passage 19 of the valve body 17 and the channel 14 of flow passage 20 of the modulator body 11.

The flow modulator 10 further comprises a gear transmission 22.

An input side of the gear transmission 22 is in operative connection with the actuator 21 having a fixed axis of rotation 23.

An output side of the gear transmission 22 is in operative connection with the valve body 17 having a translationally displaceable axis of rotation 24.

The valve body 17 has a guide pin 25 being positioned in the axis of rotation 24 of the valve body 17. The modulator body 11 has a guide groove 26 for the guide pin 25 of the valve body 17.

The guide groove 26 is configured to allow a rotational displacement of the valve body 17 relative to the modulator body 11.

The guide groove 26 is further configured to allow a translational displacement of the valve body 17 relative to the modulator body 11 in a distance direction X of the axis of rotation 23 of the actuator 21 and the axis of rotation 24 of the valve body 17.

However, the guide groove 26 is further configured to prevent a translational displacement of the valve body 17 relative to the modulator body 11 diagonal and/or orthogonal to said distance direction X of the axis of rotation 23 of the actuator 11 and the axis of rotation 24 of the valve body 17.

The guide pin 25 of the valve body may be a cylinder. The guide groove 26 of modulator body 11 may be an oblong hole.

The dimension of the guide groove 26 in said distance direction X of the axis of rotation 23 of the actuator 21 and the axis of rotation 24 of the valve body 17 is larger than the diameter of the guide pin 25 thereby allowing the translational displacement of the valve body 17 relative to the modulator body 11 in said distance direction X.

The dimension of the guide groove 26 orthogonal to said distance direction X of the axis of rotation 23 of the actuator 21 and the axis of rotation 24 of the valve body 17 is adapted to the diameter of the guide pin 25 thereby preventing the translational displacement of the valve body 17 relative to the modulator body 11 diagonal and/or orthogonal to said distance direction X.

The gear transmission 22 comprises a first toothing 27 provided by a drive wheel 28. The drive wheel 28 provides or corresponds to the input side of the gear transmission 22.

The gear transmission 22 further comprises a second toothing 29 provided by the valve body 27. The valve body 27 provides or corresponds to the output side of the gear transmission 22.

The first toothing 27 is in operative connection with the second toothing 29. The first toothing 27 and the second toothing 29 comb directly into each other thereby providing a single-stage transmission. However, by using at least one further toothing between the first toothing 27 and the second toothing 29 a multi-stage transmission may be provided.

The valve body 27 has a circumferential groove 30. The drive wheel 28 connected to the axis of rotation 23 of the actuator 21 is at least partially positioned within said circumferential groove 30.

The circumferential groove 30 has radial width being configured to allow rotation of the valve body 17 relative to the modulator body 11 around the axis of rotation 24 of the valve body 17 while keeping the first toothing 27 of the drive wheel 28 always in operative connection with the second toothing 29 of the valve body 17.

In the embodiment of FIGS. 1*a* to 1*d*, the first toothing 27 is provided by a section of the drive wheel 28 that is at least partially positioned within said circumferential groove 30, while the second toothing 29 is provided a wall of the circumferential groove 30, namely by a radial outer wall 30*a* of the circumferential groove 30.

In the embodiment of FIGS. 2*a* and 2*b*, the first toothing 27 is provided by a section of the drive wheel 28 that is at least partially positioned within said circumferential groove 30, while the second toothing 29 is provided a wall of the circumferential groove 30, namely by a radial inner wall 30*b* of the circumferential groove 30.

In the embodiment of FIGS. 3*a* and 3*b*, the first toothing 27 is provided by a section of the drive wheel 28 that is at positioned outside of said circumferential groove 30, while the second toothing 29 is provided by a wall 31 of the valve body 17, namely as an internal toothing of said wall 31.

In the embodiment of FIGS. 4*a* and 4*b*, the first toothing 27 is provided by a section of the drive wheel 28 that is at positioned outside of said circumferential groove 30, while the second toothing 29 is provided by a wall 31 of the valve body 17, namely as an external toothing of said wall 31.

The embodiments of FIGS. 1*a* to 4*b* differ from each other by the technical design of the first toothing 27 and the second toothing 29.

In the embodiment of FIGS. 1*a* to 1*d* and in the embodiment of FIGS. 2*a* and 2*b* the first toothing 27 is provided by a section of the drive wheel 28 that is at least partially positioned within said circumferential groove 30 and the second toothing 29 is provided by a wall of the circumferential groove 30. The opposite wall of the groove 30 does not have a toothing and is smooth. In the embodiment of FIGS. 3*a* and 3*b* and in the embodiment of FIGS. 4*a* and 4*b* the first toothing 27 is provided by a section of the drive wheel 28 that is positioned outside said circumferential groove 30 and the second toothing 29 is provided a wall 31 of the valve body 17. In these embodiments both opposite walls of the groove 30 are smooth.

Nevertheless, in all embodiments the groove 30 of the valve body 17 has radial width being configured to allow the rotation of the valve body 17 relative to the modulator body 11 around the axis of rotation 24 of the valve body 17 while keeping the first toothing 27 of the drive wheel 28 always in operative connection with the second toothing 29 of the valve body 17. The drive wheel 28 bears against a respective wall of the groove 30 depending on the position and/or displacement of the valve body 17.

The circumferential groove 30 has radial width being configured to provide a radial play between the drive wheel 28 and the valve body 17 allowing the rotation of the valve body 17 relative to the modulator body 11 around the axis of rotation 24 of the valve body 17 while keeping the first toothing 27 of the drive wheel 28 always in operative connection with the second toothing 29 of the valve body 17.

The translational displacement of the valve body 17 is provided by the interaction of the guide pin 25 of the valve body 17 with the guide groove 26 of the modulator body and by the interaction of the circumferential groove 30 of the valve body 17 with the drive wheel 28.

LIST OF REFERENCE SIGNS

10 flow modulator
11 modulator body
12 housing
12*a* side wall
12*b* bottom wall
12*c* top wall
13 opening
14 channel
15 opening
16 interior space
17 valve body
18 opening
19 flow passage
20 flow passage
21 actuator
22 gear transmission
23 axis of rotation
24 axis of rotation
25 guide pin
26 guide groove
27 first toothing
28 drive wheel
29 second toothing
30 groove
30*a* radial outer wall
30*b* radial inner wall
31 wall

The invention claimed is:

1. A flow modulator for a fluid, comprising:

a modulator body having a channel providing a flow passage for the fluid;

a valve body having an opening providing another flow passage for the fluid, wherein the valve body has a guide pin being positioned in an axis of rotation of the valve body;

an actuator by which the valve body is rotatably displaceable relative to the modulator body to modulate the fluid flow by changing an overlap between the opening or a flow channel of the valve body and the channel or the flow passage of the modulator body;

a gear transmission, wherein an input side of the gear transmission is in operative connection with the actuator having a fixed axis of rotation, and wherein an output side of the gear transmission is in operative connection with the valve body having a translationally displaceable axis of rotation, wherein the modulator body has a guide groove for the guide pin of the valve body, the guide groove is configured to:

allow a rotational displacement of the valve body relative to the modulator body, allow a translational displacement of the valve body relative to the modulator body in a distance direction (X) of the axis of rotation of the actuator and the axis of rotation of the valve body, and prevent the translational displacement of the valve body relative to the modulator body diagonal and/or orthogonal to said distance direction of the axis of rotation of the actuator and the axis of rotation of the valve body.

2. The flow modulator as claimed in claim 1, wherein:

the guide pin of the valve body is a cylinder, the guide groove of the modulator body is an oblong hole.

3. The flow modulator as claimed in claim 2, wherein:

the gear transmission comprises a first toothing provided by a drive wheel, the gear transmission comprises a second toothing provided by the valve body, the first toothing is in operative connection with the second toothing.

4. The flow modulator as claimed in claim 1, wherein:

the gear transmission comprises a first toothing provided by a drive wheel, the gear transmission comprises a second toothing provided by the valve body, the first toothing is in operative connection with the second toothing.

5. The flow modulator as claimed in claim 4, wherein:

the valve body has a circumferential groove, the drive wheel is at least partially positioned within said circumferential groove, the circumferential groove has radial width being configured to allow rotation of the valve body around the axis of rotation of the valve body while keeping the first toothing of the drive wheel always in operative connection with the second toothing of the valve body.

6. The flow modulator as claimed in claim 5, wherein:

the first toothing is provided by a section of the drive wheel that is at least partially positioned within said circumferential groove, the second toothing is provided by a wall of the circumferential groove.

7. The flow modulator as claimed in claim 6, wherein the second toothing is provided by a radial inner wall of the circumferential groove.

8. The flow modulator as claimed in claim 6, wherein the second toothing is provided by a radial outer wall of the circumferential groove.

9. The flow modulator as claimed in claim 5, wherein:

the first toothing is provided by a section of the drive wheel that is at positioned outside of said circumferential groove, the second toothing is provided by a wall of the valve body.

10. The flow modulator as claimed in claim 9, wherein the second toothing is provided as an internal toothing.

11. The flow modulator as claimed in claim 9, wherein the second toothing is provided as an external toothing.

* * * * *